United States Patent
Vaidyanathan et al.

(10) Patent No.: US 10,447,828 B2
(45) Date of Patent: Oct. 15, 2019

(54) CROSS-APPLICATION SERVICE-DRIVEN CONTEXTUAL MESSAGES

(71) Applicant: Microsoft Technology Licensing, LLC, Redmond, WA (US)

(72) Inventors: Priya Vaidyanathan, Clyde Hill, WA (US); Scott Hoogerwerf, Seattle, WA (US); Vlad Riscutia, Redmond, WA (US); Darron J. Stepanich, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 15/058,075

(22) Filed: Mar. 1, 2016

(65) Prior Publication Data
US 2017/0257459 A1 Sep. 7, 2017

(51) Int. Cl.
*G06F 15/16* (2006.01)
*H04L 29/08* (2006.01)
*H04L 29/06* (2006.01)

(52) U.S. Cl.
CPC ............ *H04L 69/329* (2013.01); *H04L 67/06* (2013.01); *H04L 67/42* (2013.01); *H04L 69/328* (2013.01)

(58) Field of Classification Search
CPC ..... H04L 67/327; H04L 67/42; H04L 69/329; H04L 69/328; H04L 67/06
USPC ........................................ 709/203, 205, 206
See application file for complete search history.

(56) References Cited

U.S. PATENT DOCUMENTS

| | | | | |
|---|---|---|---|---|
| 6,297,819 B1* | 10/2001 | Furst | .................. | G06F 3/00 707/E17.001 |
| 6,502,131 B1* | 12/2002 | Vaid | ................ | H04L 1/1854 709/224 |
| 7,631,007 B2* | 12/2009 | Morris | ............. | G06Q 10/063 705/7.11 |
| 7,966,219 B1* | 6/2011 | Singh | ................ | G06Q 30/02 705/26.7 |

(Continued)

FOREIGN PATENT DOCUMENTS

WO 2007064480 A1 6/2007
WO 2011090541 A2 7/2011

(Continued)

OTHER PUBLICATIONS

Kovacs, Geza, "ScreenMatch: Providing Context to Software Translators by Displaying Screenshots", In Proceedings of ACM SIGCHI Conference on Human Factors in Computing Systems, May 5, 2012, 6 pages.

*Primary Examiner* — Thu Ha T Nguyen

(57) ABSTRACT

Aspects of the present disclosure relate to cross-application service-driven dynamic contextual messages. In one aspect, content is retrieved from a server computing device. The content may include at least one rule and at least one contextual message. The content retrieved from the server computing device may be stored. A dynamic background application may detect an action associated with a client application. In response to detecting the action associated with the client application, a contextual message may be identified from the at least one contextual message based on a rule from the at least one rule. The dynamic background application may display the identified contextual message within the client application.

20 Claims, 9 Drawing Sheets

(56) References Cited

U.S. PATENT DOCUMENTS

| | | | |
|---|---|---|---|
| 8,134,727 B1* | 3/2012 | Shmunis | G06Q 10/107 358/1.13 |
| 8,161,081 B2* | 4/2012 | Kaufman | G06F 7/00 707/802 |
| 8,473,604 B2 | 6/2013 | Misra et al. | |
| 8,560,400 B1 | 10/2013 | Lee | |
| 8,818,994 B2 | 8/2014 | Kowalski et al. | |
| 8,959,476 B2 | 2/2015 | Ramani et al. | |
| 9,098,333 B1* | 8/2015 | Obrecht | G06F 9/50 |
| 10,237,256 B1* | 3/2019 | Pena | H04L 63/08 |
| 2006/0161646 A1* | 7/2006 | Chene | G06F 17/243 709/223 |
| 2007/0081197 A1* | 4/2007 | Omoigui | G06F 16/24575 358/403 |
| 2007/0256055 A1* | 11/2007 | Herscu | G06F 8/51 717/115 |
| 2008/0288405 A1* | 11/2008 | John | G06Q 20/40 705/44 |
| 2009/0037355 A1* | 2/2009 | Brave | G06F 16/9535 706/45 |
| 2009/0327401 A1* | 12/2009 | Gage | G06F 15/16 709/203 |
| 2010/0186062 A1 | 7/2010 | Banti et al. | |
| 2010/0306249 A1* | 12/2010 | Hill | G06F 17/30867 707/769 |
| 2012/0191716 A1* | 7/2012 | Omoigui | H01L 27/1463 707/740 |
| 2012/0209871 A1 | 8/2012 | Lai et al. | |
| 2012/0210423 A1* | 8/2012 | Friedrichs | G06F 21/564 726/22 |
| 2012/0330869 A1* | 12/2012 | Durham | G06N 5/022 706/16 |
| 2013/0060938 A1* | 3/2013 | McColgan | H04L 51/043 709/224 |
| 2013/0080641 A1* | 3/2013 | Lui | H04L 67/10 709/226 |
| 2014/0067901 A1 | 3/2014 | Shaw et al. | |
| 2014/0100835 A1* | 4/2014 | Majumdar | G06Q 10/047 703/11 |
| 2014/0108506 A1* | 4/2014 | Borzycki | H04L 67/10 709/203 |
| 2014/0171039 A1 | 6/2014 | Bjontegard | |
| 2014/0195609 A1* | 7/2014 | Wise | H04L 65/403 709/204 |
| 2014/0298469 A1* | 10/2014 | Marion | G06F 21/55 726/23 |
| 2014/0310392 A1* | 10/2014 | Ho | H04L 69/16 709/223 |
| 2015/0188959 A1 | 7/2015 | Sayed | |
| 2015/0189069 A1 | 7/2015 | Sayed | |
| 2015/0310188 A1* | 10/2015 | Ford | G06F 21/10 726/28 |
| 2015/0319116 A1* | 11/2015 | Chavali | H04L 12/1895 709/206 |
| 2015/0365480 A1* | 12/2015 | Soto | H04L 12/2827 709/224 |
| 2016/0205142 A1* | 7/2016 | Arkin | H04L 63/0263 726/1 |
| 2016/0248860 A1* | 8/2016 | Dunbar | H04L 67/16 |
| 2016/0380915 A1* | 12/2016 | Umapathy | G06F 9/451 709/226 |
| 2017/0041296 A1* | 2/2017 | Ford | G06F 16/951 |
| 2018/0350144 A1* | 12/2018 | Rathod | H04W 4/029 |

FOREIGN PATENT DOCUMENTS

| | | |
|---|---|---|
| WO | 2014133876 A1 | 9/2014 |
| WO | 2015063494 A1 | 5/2015 |

\* cited by examiner

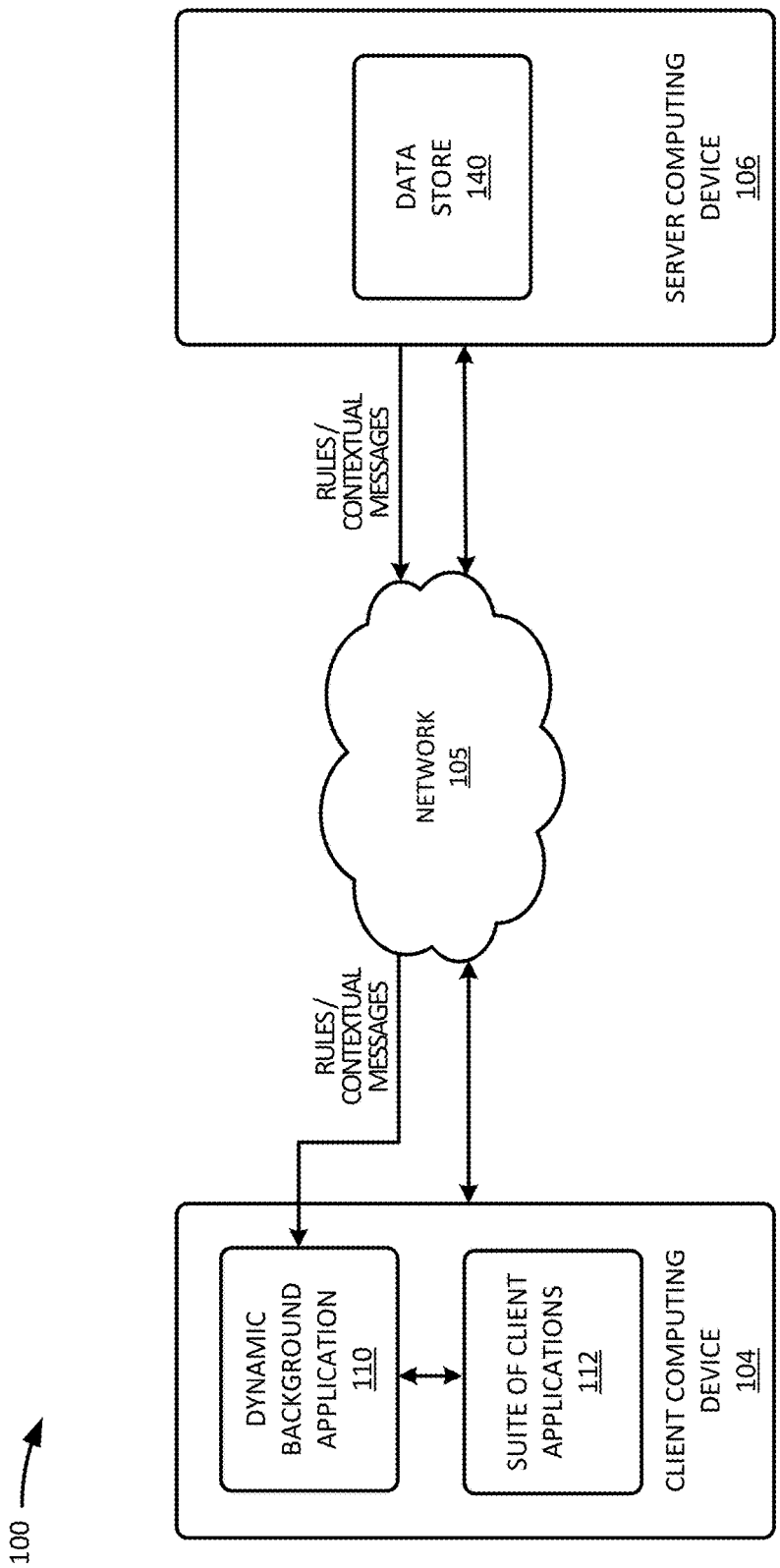

CROSS-APPLICATION SERVICE-DRIVEN CONTEXTUAL MESSAGES

BACKGROUND

Applications such as word processing applications, spreadsheet applications, electronic slide presentation applications, and the like, may display contextual messages relative to the applications. For example, when a user launches an application, the application may display a message welcoming the user to the application. Each individual application implements a rich canvas for displaying such messages. Furthermore, each individual application manages the content of such messages including retrieving contextual messages from a server, storing contextual messages, and rendering contextual messages. In this regard, in order to display a new and/or updated contextual message within an application, the application has to be updated with new software. In turn, current techniques for displaying contextual messages within an application may be slow, inefficient, time consuming and expensive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to cross-application service-driven dynamic contextual messages. In one aspect, content is retrieved from a server computing device. The content may include at least one rule and at least one contextual message. The content retrieved from the server computing device may be stored. A dynamic background application may detect an action associated with a client application. In response to detecting the action associated with the client application, a contextual message may be identified from the at least one contextual message based on a rule from the at least one rule. The dynamic background application may display the identified contextual message within the client application.

In another aspect, methods for displaying dynamic contextual messages within a client application are disclosed. In one implementation, a rule and a contextual message are retrieved from a server computing device. A dynamic background application may detect a first occurrence of an action associated with a first client application. In response to detecting the first occurrence of the action associated with the first client application, the dynamic background application may display the contextual message within the first client application. An updated rule and an updated contextual message may be received from the server computing device. The dynamic background application may detect a second occurrence of the action associated with the first client application. In response to detecting the second occurrence of the action associated with the first client application, the dynamic background application may display the updated contextual message within the first client application.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 1 illustrates an exemplary cross-application service-driven system, according to an example aspect.

DETAILED DESCRIPTION

Figure 2A:
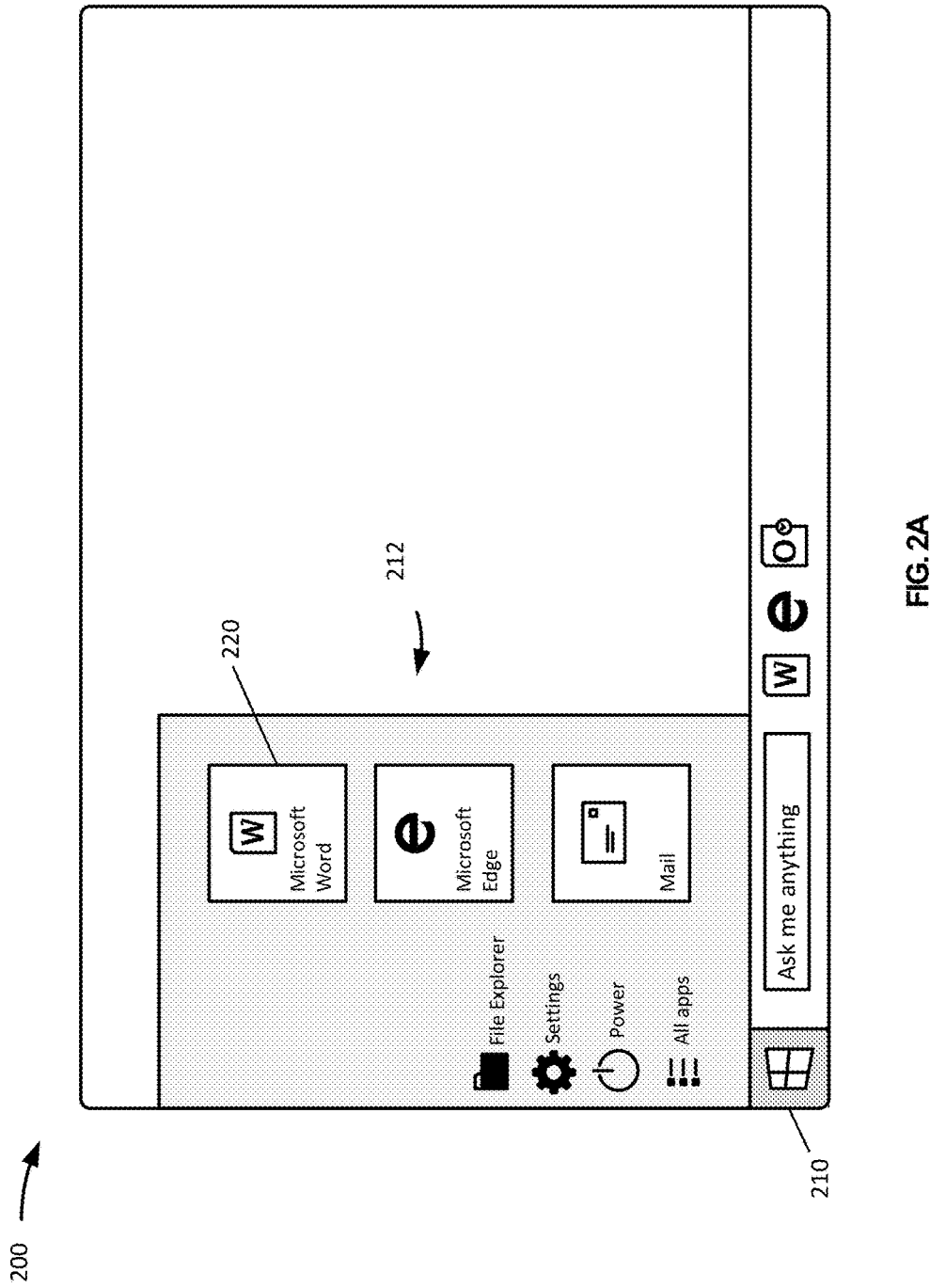
FIG. 2A illustrates one view in a progression of views of a user interface of a client computing device, according to an example aspect.

Aspects of the disclosure are generally directed to a cross-application service-driven system for dynamically displaying contextual messages. For example, contextual messages may be displayed dynamically to a user across a suite of applications without requiring that each individual application implement a rich canvas for displaying the contextual messages. Furthermore, displaying the contextual messages dynamically using the cross-application service-driven system doesn't require each application and/or the suite of applications to manage the content of the contextual messages (e.g., retrieving the contextual messages from the server, storing the contextual messages, and rendering the contextual messages). In this regard, a dynamic background application may retrieve content including rules and contextual messages from a server and store them until an action and/or trigger associated with an application is detected. When an action and/or trigger associated with an application is detected, the dynamic background application may identify, using the stored rules, a contextual message from the stored contextual messages that is relevant to the detected action. In response to identifying that a contextual message is relevant to the detected action, the dynamic background application may display the identified contextual message within the application. In this regard, as contextual messages relevant to particular actions and/or applications are updated and/or added to the system, they may be dynamically displayed across a suite of applications without requiring a new and/or updated software release for the suite of applications.

As discussed above, current techniques for displaying contextual messages require that each individual application implement a rich canvas for displaying such messages. Furthermore, each individual application manages the content of such messages including retrieving contextual messages from a server, storing contextual messages, and rendering contextual messages. In this regard, in order to display a new and/or updated contextual message within an application, the application has to be updated with new software. In some cases, current techniques for displaying contextual messages include hosting a webpage where the webpage does not match the visual styling of the host application. In turn, current techniques for displaying contextual messages within an application may be slow, inefficient, time consuming and expensive.

Accordingly, aspects described herein include a cross-application service-driven system for dynamically displaying contextual messages within a suite of applications. In one aspect, content is retrieved from a server computing device. In one example, the content may include at least one rule and at least one contextual message. In another example, the content may include metadata. The metadata may include additional information relative to the at least one contextual message. For example, the metadata may include information that identifies a location for particular content (e.g., a button) within the contextual message. The content retrieved from the server computing device may be stored by a dynamic background application. The dynamic background application may detect an action associated with an application. The application may be part of a suite of applications and include a client application. The client application may include at least one of a word processing application, a spreadsheet application, and an electronic slide presentation application. In one case, the dynamic application may detect the action associated with the application (e.g., client application) by receiving a signal from the client application when the action occurs. In another case, the dynamic background application may monitor the client application for an occurrence of the action. In some cases, the action includes at least one of launching the client application, opening a file associated with the client application, saving a file associated with the client application, sharing a file associated with the client application, and closing a file associated with the client application.

In response to detecting the action associated with the client application, a contextual message may be identified from the at least one contextual message based on a rule from the at least one rule. In one case, the at least one rule is based on at least one of the action associated with the client application, a type of client application, and user behavior. The dynamic background application may display the identified contextual message within the client application. The dynamic background application may be independent of the client application. In this regard, a technical effect that may be appreciated is that contextual messages may be displayed across a suite of applications dynamically (e.g., in real-time and as new and updated messages are added to the system) in a fast, efficient, and inexpensive manner, ultimately reducing processor load and conserving memory.

In another aspect, updated content may be retrieved from the server computing device. The updated content may comprise at least one updated rule and at least one updated contextual message. An updated contextual message from the at least one updated contextual message may be displayed based on applying a rule from the at least one updated rule. The rule may indicate that the updated contextual message is relevant to a detected action associated with the client application.

Further aspects described herein include methods for displaying dynamic contextual messages within a client application are disclosed. A rule and a contextual message may be retrieved from a server computing device. A dynamic background application may detect a first occurrence of an action associated with a first client application. In response to detecting the first occurrence of the action associated with the first client application, the dynamic background application may display the contextual message within the first client application. An updated rule and an updated contextual message may be received from the server computing device. The dynamic background application may detect a second occurrence of the action associated with the first client application. In response to detecting the second occurrence of the action associated with the first client application, the dynamic background application may display the updated contextual message within the first client application. In one example, the dynamic background application is independent of the first client application.

In some aspects, a plurality of rules and a plurality of contextual messages may be retrieved from the server computing device. The dynamic background application may detect a first occurrence of an action associated with a second client application. In response to detecting the first occurrence of the action associated with the second client application, the dynamic background application may display a contextual message from the plurality of contextual messages within the second client application based on applying a rule from the plurality of rules relevant to the detected first occurrence of the action associated with the second client application. A plurality of updated rules and a plurality of updated contextual messages may be retrieved from the server computing device. The dynamic background application may detect a second occurrence of the action associated with the second client application. In response to detecting the second occurrence of the action associated with the second client application, the dynamic background application may display an updated contextual message from the plurality of updated contextual messages within the second client application based on applying an updated rule from the plurality of updated rules relevant to the detected second occurrence of the action associated with the second client application. In one example, the dynamic background application is independent of the second client application.

In the aspects described above herein, a different contextual message may be displayed for the same action associated with the same client application without requiring a software update to the client application. As such, another technical effect that may be appreciated is that displaying contextual messages across a suite of applications is improved by utilizing an application for storing, managing, and displaying the contextual messages independently of the suite of applications themselves. A further technical effect that may be appreciated is that as contextual messages relevant to particular actions and/or applications are updated and/or added to the system, they may be dynamically displayed across a suite of applications without requiring a new and/or updated software release for the suite of applications, ultimately saving money and time and reducing processor load and conserving memory. A further technical effect that may be appreciated is that as contextual messages relevant to particular actions and/or applications are updated and/or added to the system, they may be dynamically displayed across a suite of applications while matching the look and feel of each application of the suite of applications, ultimately facilitating a compelling visual and functional experience to allow users of the suite of applications to quickly, easily, and efficiently interact with a user interface.

Referring now to the drawings, in which like numerals represent like elements through the several figures, aspects of the present disclosure and the exemplary operating environment will be described. With reference to FIG. 1, one aspect of a cross-application service-driven system 100 for dynamically displaying contextual messages across a suite of applications is illustrated. In aspects, the cross-application service-driven system 100 may include a client computing device 104 and a server computing device 106. In a basic configuration, the client computing device 104 is a handheld computer having both input elements and output elements. The client computing device 104 may be any suitable computing device for implementing the cross-application service-driven system 100 for dynamically displaying contextual messages across a suite of applications. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device 104 for implementing the cross-application service-driven system 100 for dynamically displaying contextual messages across a suite of applications may be utilized.

In aspects, the server computing device 106 may provide data to and from the client computing device 104 through a network 105. In aspects, the cross-application service-driven system 100 may be implemented on more than one server computing device 106, such as a plurality of server computing devices 106. As discussed above, the server computing device 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. The data may be communicated in accordance with various communication protocols, combinations of protocols, or variations thereof. In one example, the data may be communicated in accordance with the HTTPS (Secure Hypertext Transfer Protocol).

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the cross-application service-driven system 100 may include a client computing device 104 and a server computing device 106. The various components may be implemented using hardware, software, or a combination of hardware and software. The cross-application service-driven system 100 may be configured to dynamically display contextual messages across a suite of applications. In this regard, the client computing device 104 may include a dynamic background application 110 and a suite of client applications 112. In one example, an application within the suite of client applications 112 may include any application where it is desired to display contextual messages by another application (e.g., the dynamic background application 110) without requiring each application within the suite of client applications 112 to implement and/or develop a canvas for displaying such messages. In one case, the suite of client applications 112 may include any number of applications such as a word processing application, a spreadsheet application, an electronic slide presentation application, and the like. In one case, a file associated with an application within the suite of client applications 112 may include a word document, a spreadsheet, an electronic slide presentation, and the like. As such, an exemplary application may be an electronic slide presentation application. In this example, an exemplary file associated with the electronic slide presentation application may include an electronic slide presentation. As such, in one example, the dynamic background application 110 may receive, store, manage, render and/or display one or more contextual messages associated with the electronic slide presentation. It is appreciated that dynamic background application 110 may receive, store, manage, render and/or display one or more contextual messages associated with any number of files associated with any number of applications.

In aspects, the dynamic background application 110 may be configured to retrieve, receive, store, and manage content including one or more rules and/or one or more contextual messages associated with the suite of client applications 112. In one example, the one or more rules may indicate and/or define when and/or what type of contextual message should be rendered and/or displayed based on an action associated with one or more applications within the suite of applications 112, a type of application within the suite of applications 112, and/or user behavior associated with one or more applications within the suite of applications 112. In one example, the contextual messages may include content associated with one or more applications within the suite of applications 112 that may be helpful for a user of the suite of applications 112. Examples of such rules and contextual messages will be described in detail below relative to FIGS. 2A-2B, 3A-3B, 4 and 5.

In one aspect, content is retrieved from the server computing device 106. As discussed above, the server computing device 106 may provide data to and from the client computing device 104 through a network 105. In this regard, the server computing device 106 may include a data store 140. In one example, the data store 140 may be configured to store, create, and manage data and/or information associated with the cross-application service-driven system 100. For example, the data store 140 may store and/or create one or more rules and/or one or more contextual messages associated with the suite of client applications 112. In another example, the server computing device 106 and/or data store 140 may send one or more rules and/or one or more contextual messages to the client computing device 104 through network 105. In this regard, the server computing device 106 and/or data store 140 may send one or more rules and/or one or more contextual messages to the client computing device 104 through network 105 when a new rule and/or new contextual message is created and/or when a rule and/or contextual message is updated. In further examples, the server computing device 106 may manage one or more rules and/or one or more contextual messages associated with the suite of client applications 112. For example, the server computing device 106 may include a layer of governance to ensure that a user of the suite of applications 112 doesn't receive too many contextual messages. In another example, the server computing device 106 may ensure the contextual messages are prioritized. In yet another example, the service computing device 106 may dynamically create contextual messages for display within an application using various pieces of content to enhance the user experience. It is appreciated that although one server computing device 106 is illustrated in FIG. 1, the cross-application service-driven system 100 may include a plurality of server computing devices 106 with a plurality of data stores 140.

In aspects, the dynamic background application 110 may be configured to detect an action associated with an application within the suite of client applications 112. In another example, the dynamic background application 110 may be configured to detect an occurrence of an action associated with an application within the suite of client applications 112. As discussed above, the client application may include at least one of a word processing application, a spreadsheet application, and an electronic slide presentation application. In one case, the dynamic background application 110 may detect the action associated with the application within the suite of applications 112 by receiving a signal from the application within the suite of applications 112 when the action occurs. For example, when an action occurs and/or is performed within an application, the application may send a signal to the dynamic background application 110 that includes the type of action performed, the type of application, and/or any other information associated with the action and/or application. In another case, the dynamic background application 110 may detect the action associated with the application within the suite of applications 112 by monitoring the suite of applications 112 for an occurrence of the action.

In one example, the dynamic background application 110 may monitor one or more applications within the suite of applications 112 for an occurrence of any number of actions associated with the one or more applications within the suite of applications 112. For example, in some cases, the action being monitored may include at least one of launching an application, opening a file associated with an application, saving a file associated with an application, sharing a file associated with an application, and closing a file associated with an application. In this regard, when an application within the suite of applications 112 is launched, a signal may be sent to the dynamic background application including the type of application that was launched, the type of action (e.g., a launching action), and any other relevant information. In another case, when an application within the suite of applications 112 is launched, the dynamic background application 110 may detect that the application has been launched by monitoring the application. This described suite of applications 112 and actions associated with the suite of applications 112 are exemplary only and should not be considered as limiting. Any suitable suite of applications 112 and/or actions associated with the suite of applications 112 for implementing the cross-application service-driven system 100 for dynamically displaying contextual messages across a suite of applications may be utilized.

In aspects, in response to detecting an action associated with one or more applications within the suite of applications 112, the dynamic background application 110 may identify a contextual message from the one or more contextual messages stored by the dynamic background application 110 based on the one or more rules stored by the dynamic background application 110. In one case, the one or more rules stored by the dynamic background application 110 may be based on at least one of the action associated with the application, the type of application, and user behavior associated with the application. For example, a rule may indicate that a particular contextual message should be displayed when a particular type of action is performed within a particular type of application, which will be described in more detail below relative to FIGS. 2A-2B, 3A-3B, 4 and 5. In another example, a rule may indicate that a particular contextual message should be displayed when any type of action is performed within a particular type of application. In yet another example, a rule may indicate that a particular contextual message should be displayed when a particular type of action is performed within any type of application. In yet another example, a rule may indicate that a particular contextual message should be displayed when a particular user behavior associated with the application is detected. This list of rules is exemplary only and should not be considered as limiting. Any number of rules and/or contextual messages for implementing the cross-application service-driven system 100 for dynamically displaying contextual messages across a suite of applications may be utilized.

In aspects, the dynamic background application 110 may be configured to render and/or display one or more contextual messages within one or more applications of the suite of client applications 112. As such, the dynamic background application 110 may display the identified contextual message (as described herein) within the application associated with the detected action. As discussed above, the identified contextual message may provide information and/or content useful for a user of the application associated with the detected action. The dynamic background application 110 may be independent of the suite of client applications 112. In this regard, contextual messages may be dynamically displayed across the suite of applications 112 without requiring a new and/or updated software release for the suite of applications 112, ultimately saving money and time and reducing processor load and conserving memory.

In another aspect, the server computing device 106 may be configured to create new and/or updated rules and contextual messages. In this regard, the dynamic background application 110 may be configured to retrieve, receive, store, and manage updated content including one or more updated rules and/or one or more updated contextual messages associated with the suite of client applications 112. In one example, the one or more updated rules may indicate and/or define when and/or what type of contextual message should be rendered and/or displayed based on an action associated with one or more applications within the suite of applications 112, a type of application within the suite of applications 112, and/or user behavior associated with one or more applications within the suite of applications 112. In another example, the one or more rules may indicate that the updated contextual message is relevant to a detected action associated with an application within the suite of applications 112.

In one example, the updated contextual messages may include content associated with one or more applications within the suite of applications 112 that may be helpful for a user of the suite of applications 112. As such, the dynamic background application 110 may render and/or display a plurality of contextual messages in response to detecting an action associated with an application within the suite of applications 112. For example, the dynamic background application 110 may display a first contextual message in response to detecting a first occurrence of an action associated with a particular application. The dynamic background application 110 may retrieve and store updated rules and/or contextual messages associated with the particular application. The dynamic background application 110 may display a second contextual message (e.g., from the retrieved and stored updated contextual messages) in response to detecting a second occurrence of the action (e.g., the same type of action described above relative to the first occurrence of the action) associated with the particular application.

Referring now to FIG. 2A, one view in a progression of views of a user interface 200 of the client computing device 104 is illustrated. In one example, the user interface 200 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface 200 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

Figure 2B:
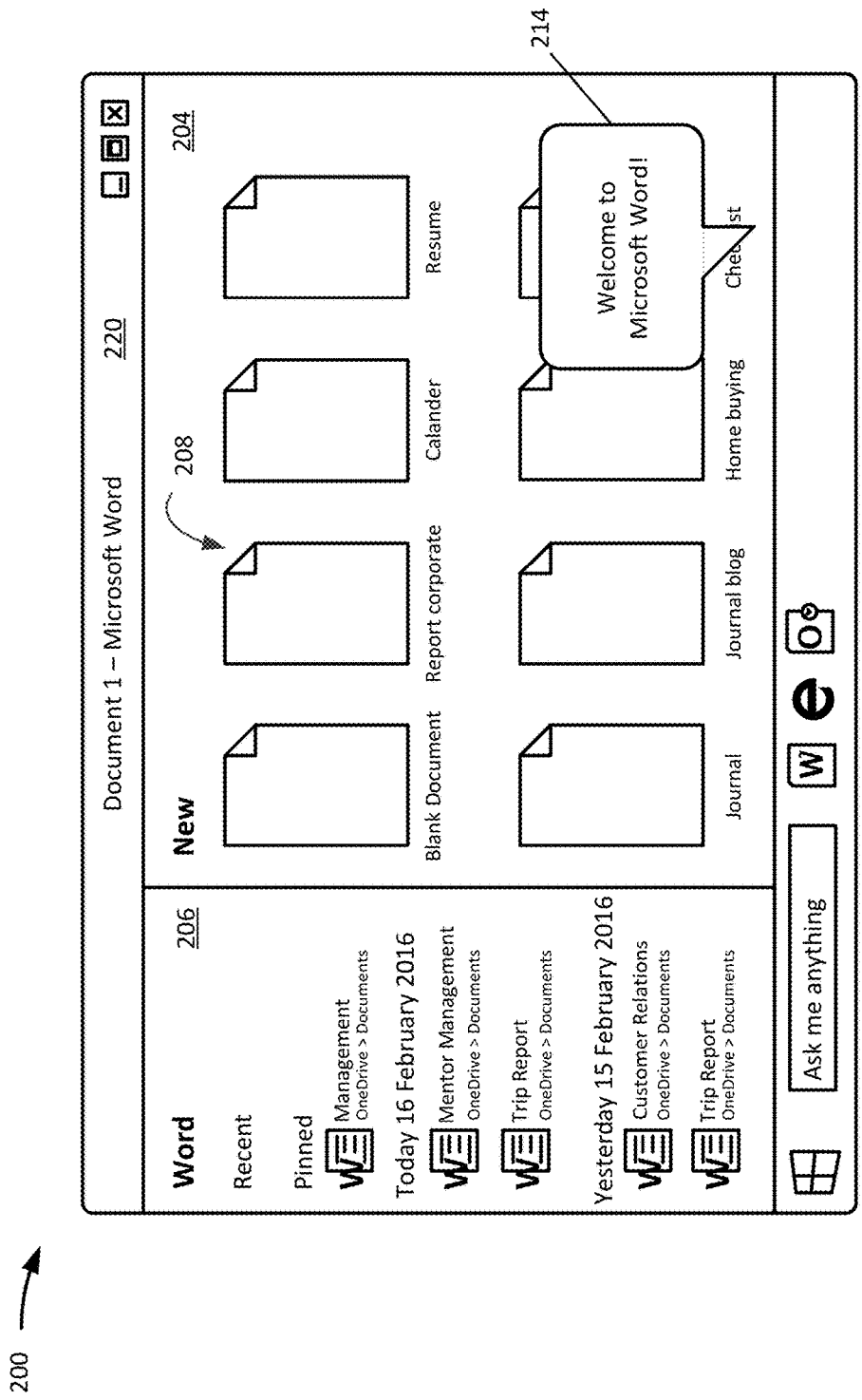
FIG. 2B illustrates another view in the progression of views of the user interface of the client computing device of FIG. 2A, according to an example aspect.

In one aspect, the view of the user interface 200 may include a start button 210 and a plurality and/or suite of applications 212. The suite of applications 212 may include applications similar to the suite of applications 112 discussed above herein. For example, the suite of applications 212 may include a word processing application, a spreadsheet application, an electronic slide presentation application, and the like. The suite of applications 212 may be displayed within the user interface 200 in response to receiving a selection of the start button 210. As illustrated in FIG. 2A, the suite of applications 212 includes at least a word processing application 220. In response to receiving a selection of the word processing application 220, one view of the word processing application 220 may be displayed within the user interface 200, as illustrated in FIG. 2B FIG. 2B illustrates another view in a progression of views of the user interface 200 of the client computing device 104, according to an example aspect. The view of the user interface 200 illustrated in FIG. 2B includes one view of the word processing application 220. The view of the word processing application 220 includes a canvas 204, a contextual panel 206, a plurality of user interface elements 208, and a contextual message 214. The canvas 204 may display user interface elements 208 and/or the contextual message 214. The contextual panel 206 may include recent files associated with the word processing application 220. The user interface elements 208 may include a plurality of various types of documents and/or templates. As illustrated in FIG. 2B, the contextual message 214 welcomes a user to the word processing application 220. In this example, in response to the dynamic background application 110 detecting the "launch" action (e.g., when a selection of the word processing application 220 is received as described relative to FIG. 2A) associated with the word processing application 220, the dynamic background application 110 may identify a contextual message from stored contextual messages based on stored rules. In this particular example, the dynamic background application 110 identified the contextual message, "Welcome to Microsoft Word," as relevant to the detected "launch" action associated with the word processing application 220 based on applying at least one rule from the stored rules. The dynamic background application 110 may apply a rule that indicates to display the contextual message, "Welcome to Microsoft Word," when a word processing application is launched.

Figure 3A:
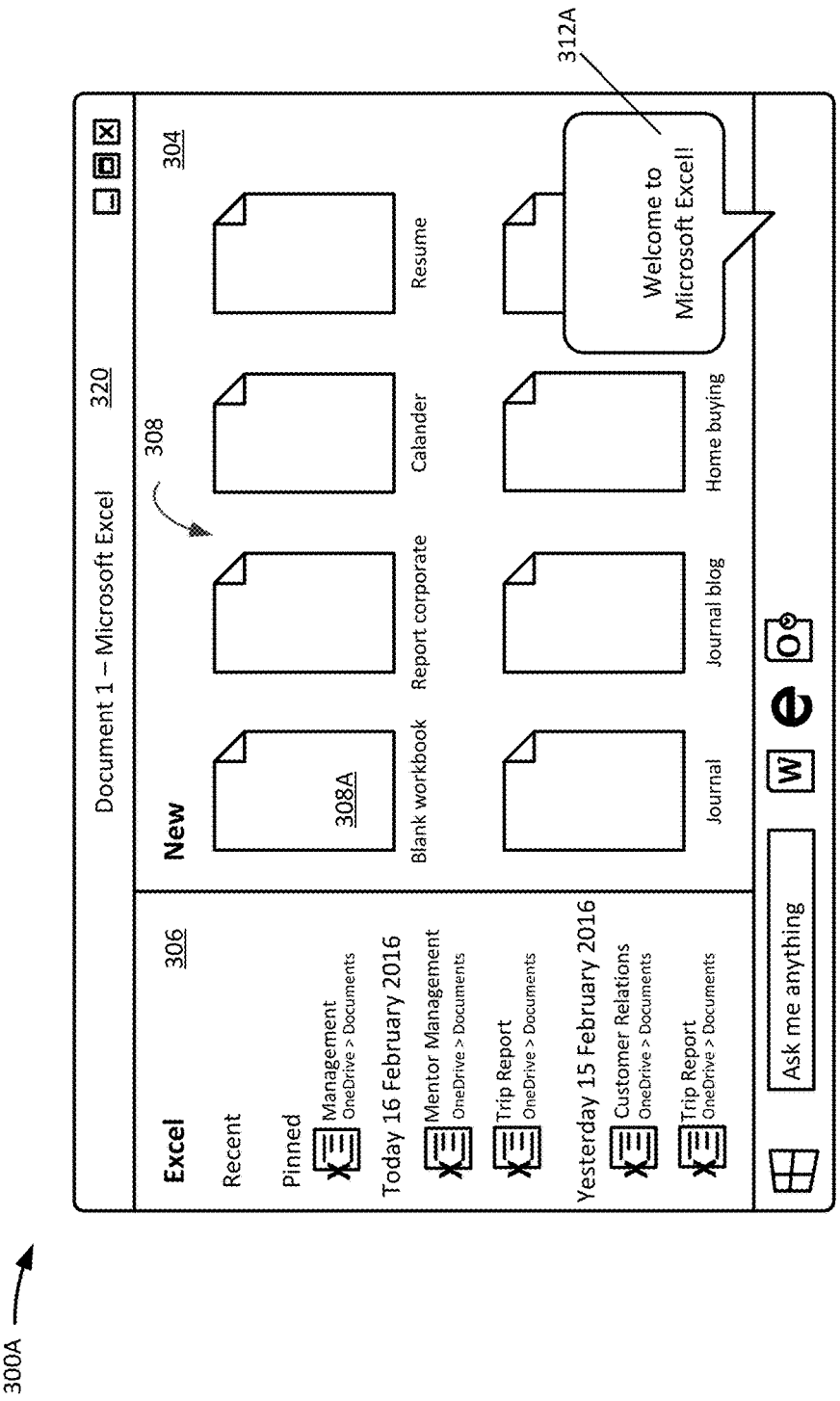
FIG. 3A illustrates one view in a progression of views of a spreadsheet application, according to an example aspect.

FIG. 3A illustrates one view 300A in a progression of views of a spreadsheet application 320, according to an example aspect. The spreadsheet application 320 may include a canvas 304, a contextual panel 306, a plurality of user interface elements 308, and a contextual message 312A. The canvas 304 may display user interface elements 308 and the contextual message 312A. The contextual panel 306 may include recent files associated with the spreadsheet application 320. The user interface elements 308 may include a plurality of various types of documents, files, and/or templates. In particular, the plurality of user interface elements 308 include a blank workbook 308A. The contextual message 312A includes the welcome message, "Welcome to Microsoft Excel." Similar to the welcome message described above relative to FIG. 2B, the contextual message 312A may be displayed in response to the dynamic background application 110 detecting a "launch" action associated with the spreadsheet application 320. In response to receiving a selection of the blank workbook 308A another view in a progression of views of the spreadsheet application 320 may be displayed within the user interface of the client computing device 104, as illustrated in FIG. 3B.

Figure 3B:
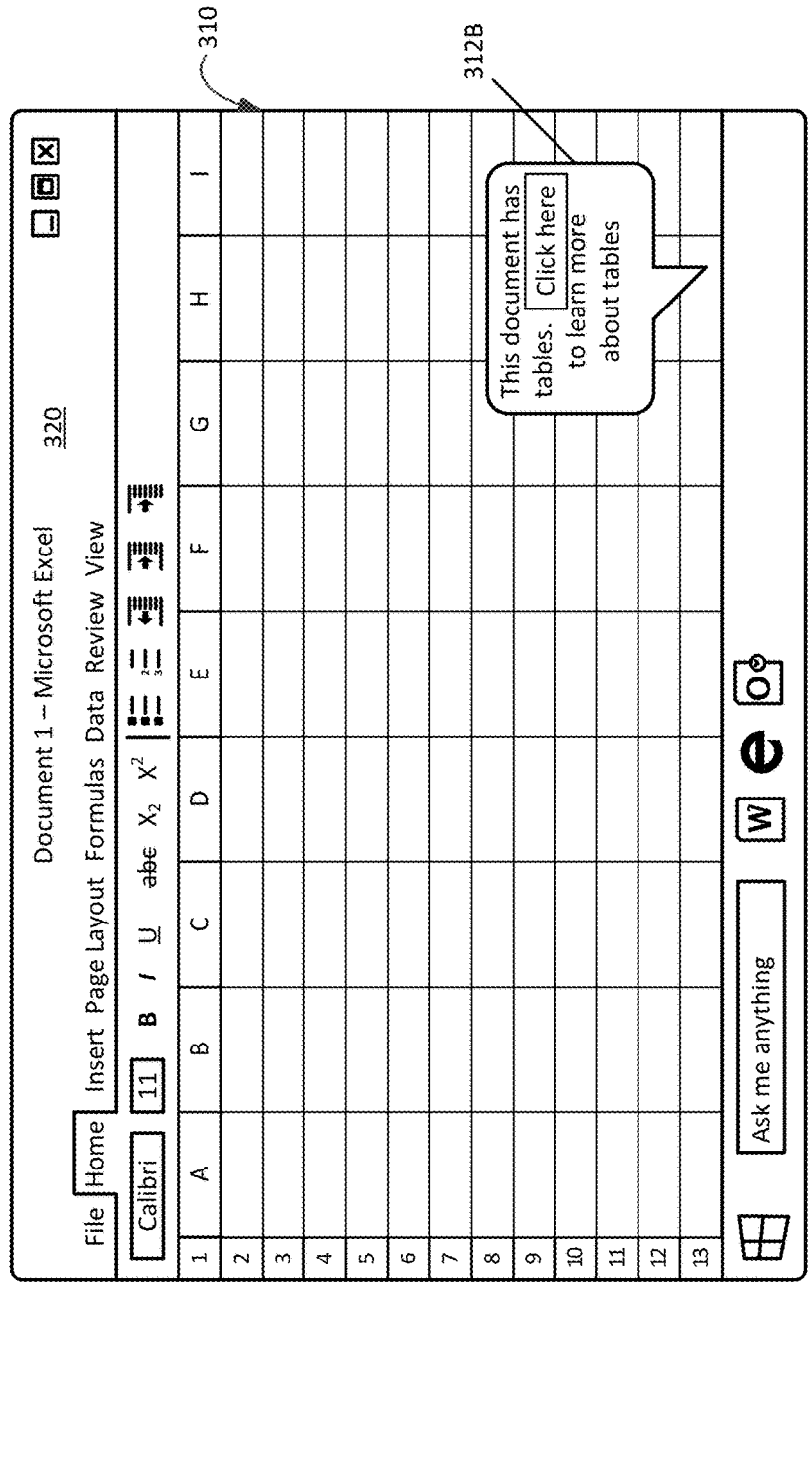
FIG. 3B illustrates another view in the progression of views of the spreadsheet application, according to an example aspect.

FIG. 3B illustrates another view 300B in a progression of views of the spreadsheet application 320, according to an example aspect. The spreadsheet application 320 includes a spreadsheet 310 and a contextual message 312B. The contextual message 312B may include contextual help. For example, the contextual message 312B includes the message, "This document has tables. Click here to learn more about tables." In this example, in response to the dynamic background application 110 detecting an "open" action (e.g., when a selection of the blank workbook 308A is received as described relative to FIG. 3A) associated with the spreadsheet application 320, the dynamic background application 110 may identify a contextual message from stored contextual messages based on stored rules. In this particular example, the dynamic background application 110 identified the contextual message, "This document has tables. Click here to learn more about tables," as relevant to the detected "open" action associated with the spreadsheet application 320 based on applying at least one rule from the stored rules. The dynamic background application 110 may apply a rule that indicates to display the contextual message, "This document has tables. Click here to learn more about tables," when a file (e.g., a blank workbook) associated with the spreadsheet application 320 is opened.

Figure 4:
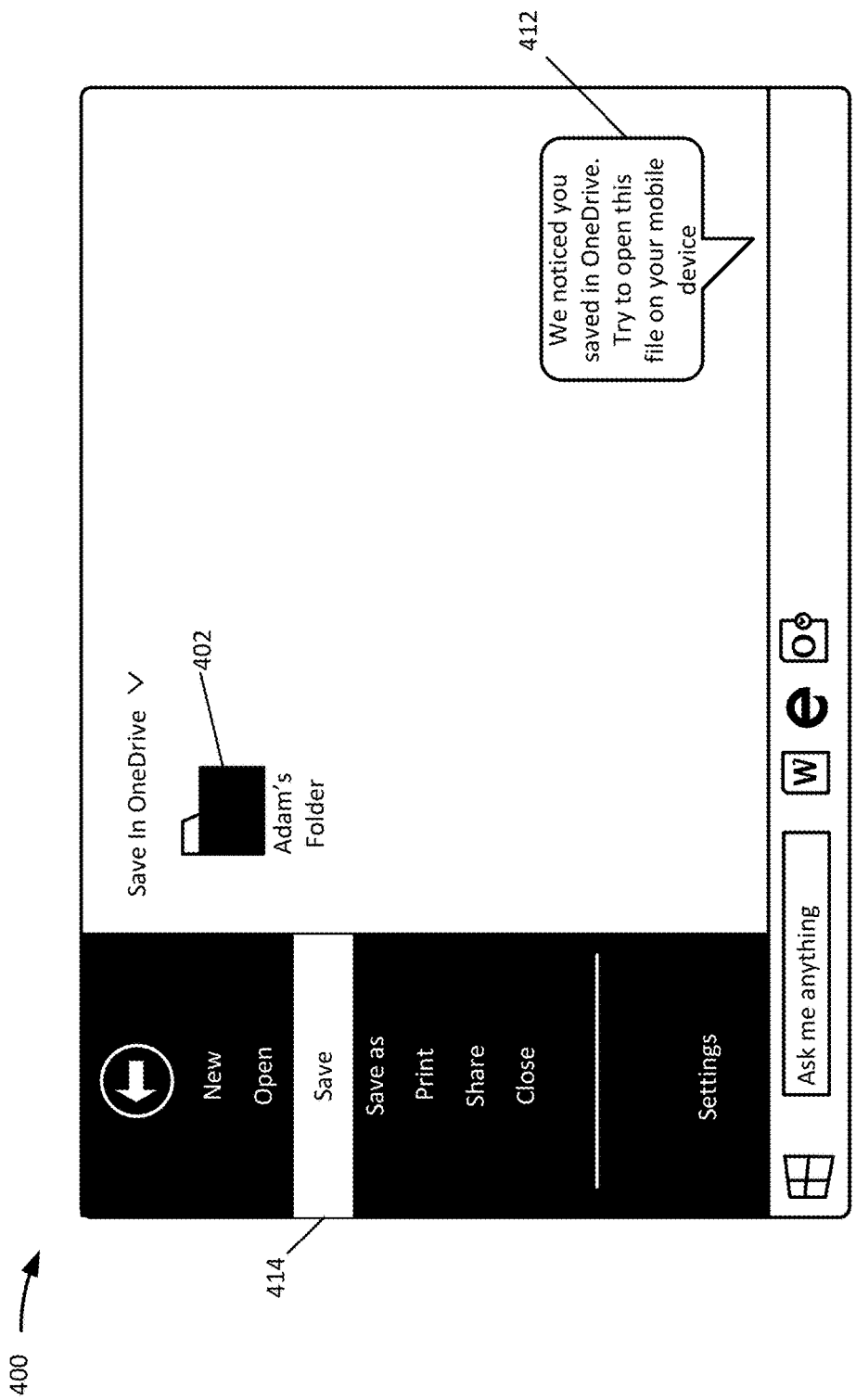
FIG. 4 illustrates one view of a word processing application for displaying a contextual message, according to an example aspect.

FIG. 4 illustrates one view of a word processing application 400 for displaying a contextual message, according to an example aspect. The view of the word processing application 400 may include a folder 402, a contextual message 412, and a save function 414. The folder 402 may be a designated folder for saving a word processing file from the word processing application 400 in a storage location such as OneDrive. In response to receiving a selection of the save function 414, the word processing file may be saved to a designated location, such as the folder 402. The contextual message 412 may include contextual information helpful for a user of the word processing application 400. For example, the contextual message 412 includes the message, "We noticed you saved in OneDrive. Try to open this file on your mobile device." In this example, in response to the dynamic background application 110 detecting a "save" action (e.g., when a selection of the save function 414 is received) associated with the word processing application 400, the dynamic background application 110 may identify a contextual message from stored contextual messages based on stored rules. In this particular example, the dynamic background application 110 identified the contextual message, "We noticed you saved in OneDrive. Try to open this file on your mobile device," as relevant to the detected "save" action associated with the word processing application 400 based on applying at least one rule from the stored rules. The dynamic background application 110 may apply a rule that indicates to display the contextual message, "We noticed you saved in OneDrive. Try to open this file on your mobile device," when a file associated with the word processing application 400 is saved. In another example, when a file associated with the word processing application 400 is saved to a location other than OneDrive, the dynamic background application 110 may apply a rule that indicates to display a contextual message that indicates that if the user saves the file to OneDrive, they can access the file from other devices (not illustrated).

Figure 5:
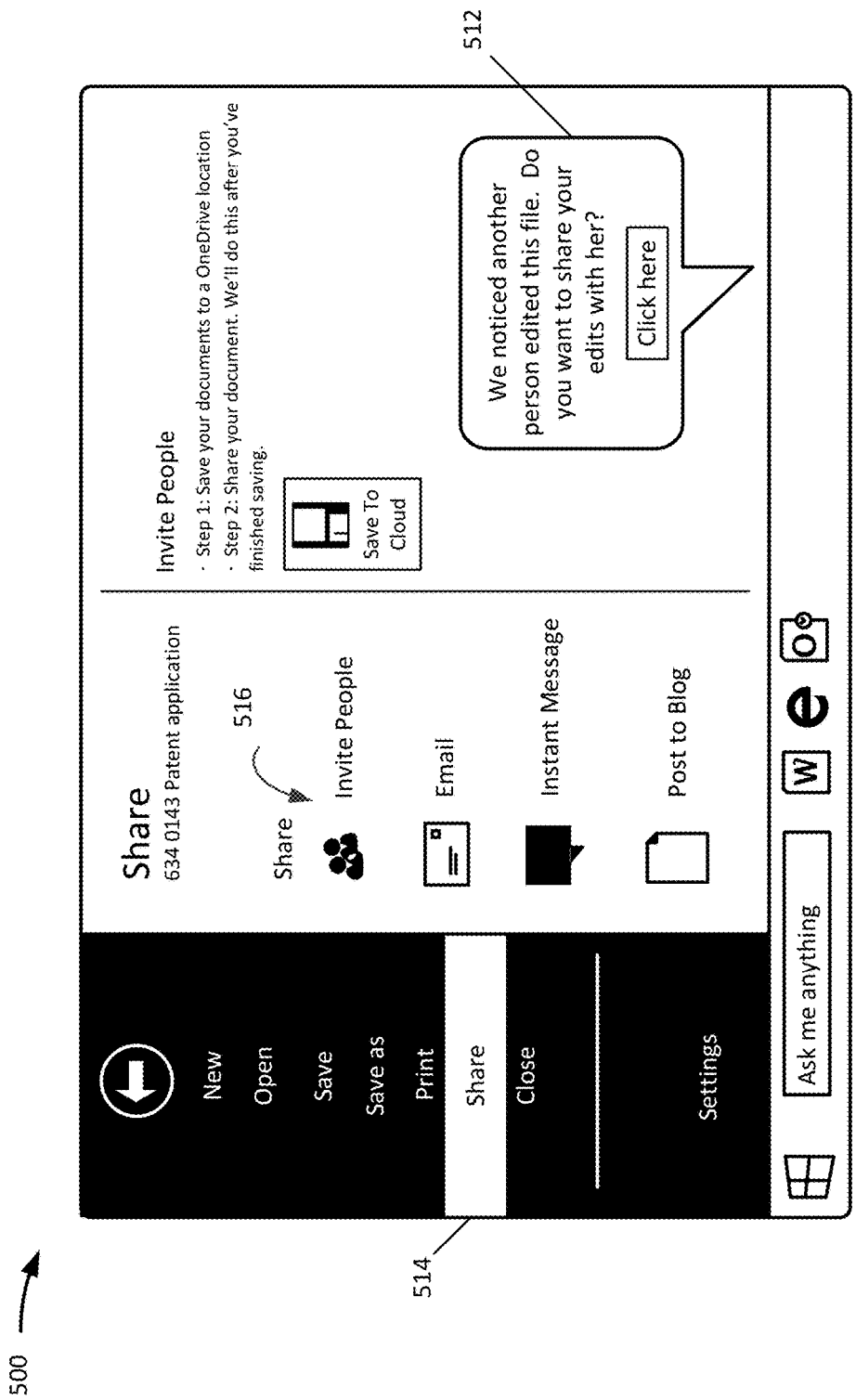
FIG. 5 illustrates one view of a word processing application for displaying a contextual message, according to an example aspect.

FIG. 5 illustrates one view of a word processing application 500 for displaying a contextual message, according to an example aspect. The view of the word processing application 500 may include a contextual message 512, a share function 514, and share options 516. The share options 516 may include options for sharing a file associated with the word processing application 500 (e.g., Email, Instant Messaging). In response to receiving a selection of the share function 514, the word processing file may be shared via a designated option, such as Email. The contextual message 512 may include contextual information helpful for a user of the word processing application 500. For example, the contextual message 512 includes the message, "We noticed another person edited this file. Do you want to share your edits with her? Click here." In this example, in response to the dynamic background application 110 detecting a "share" action (e.g., when a selection of the share function 514 is received) associated with the word processing application 500, the dynamic background application 110 may identify a contextual message from stored contextual messages based on stored rules. In this particular example, the dynamic background application 110 identified the contextual message, "We noticed another person edited this file. Do you want to share your edits with her? Click here," as relevant to the detected "share" action associated with the word processing application 500 based on applying at least one rule from the stored rules. The dynamic background application 110 may apply a rule that indicates to display the contextual message, "We noticed another person edited this file. Do you want to share your edits with her? Click here," when a file associated with the word processing application 500 is shared.

In some aspects, in response to receiving a selection of a "close" action associated with an application within the suite of applications 112, the dynamic background application 110 may identify a contextual message that indicates that a user did not use a particular feature within the application (not illustrated). The examples of rules and/or contextual messages displayed across the suite of applications 112 described herein relative to FIGS. 2A-2B, 3A-3B, 4 and 5 are exemplary only and should not be considered as limiting. Any number of rules and/or contextual messages for implementing the cross-application service-driven system 100 for dynamically displaying contextual messages across a suite of applications may be utilized. For example, upon detecting the "launch" action (as discussed relative to FIG. 2B), a contextual message such as, "We noticed that you sent this file as an email attachment to someone else, would you like Word to upload it to OneDrive so you can work on the file at the same time?" may be displayed when a word processing application is launched.

Figure 6:
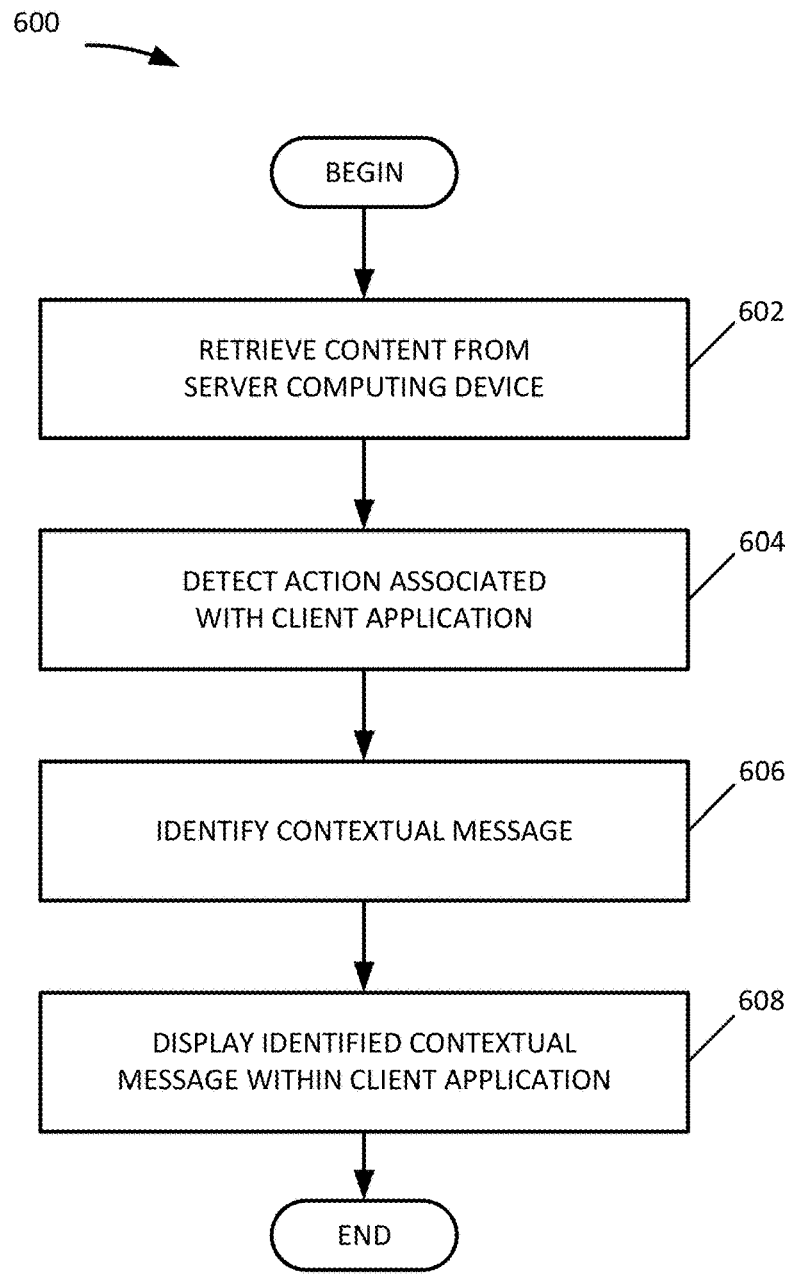
FIG. 6 illustrates an exemplary method for dynamically displaying contextual messages within a client application, according to an example aspect.

Referring now to FIG. 6, an exemplary method 600 for dynamically displaying contextual messages within a client application, according to an example aspect is shown. Method 600 may be implemented on a computing device or a similar electronic device capable of executing instructions through at least one processor. Method 600 may begin at operation 702, where content may be retrieved from a server computing device. The content may include at least one rule and at least one contextual message. In one example, the at least one rule may indicate and/or define when and/or what type of contextual message should be rendered and/or displayed based on an action associated with one or more applications within the suite of applications, a type of application within the suite of applications, and/or user behavior associated with one or more applications within the suite of applications. In one example, the at least one contextual message may include content associated with one or more applications within the suite of applications that may be helpful for a user of the suite of applications.

When content is retrieved from the server computing device, flow proceeds to operation 604 where an action associated with the client application is detected via a dynamic background application. The client application may be part of a suite of applications and include the client application. The client application may include at least one of a word processing application, a spreadsheet application, and an electronic slide presentation application. In one case, the dynamic application may detect the action associated with the application (e.g., client application) by receiving a signal from the client application when the action occurs. In another case, the dynamic background application may monitor the client application for an occurrence of the action.

In response to detecting the action associated with the client application, flow proceeds to operation 706, where a contextual message is identified, via the dynamic background application, from the at least one contextual message based on a rule from the at least one rule. In one case, the at least one rule is based on at least one of the action associated with the client application, a type of client application, and user behavior associated with the client application. For example, a rule may indicate that a particular contextual message should be displayed based on the detected action.

When a contextual message is identified from the at least one contextual message based on a rule from the at least one rule, flow proceeds to operation 608 where the identified contextual message is displayed, via the dynamic background application, within the client application. In one example, the identified contextual message is displayed within a canvas of the client application. The dynamic background application may be independent of the client application. In this regard, the identified contextual message may be dynamically displayed within the client application without requiring a new and/or updated software release for the client application. In turn, contextual messages may be displayed within the client application while saving money and time and reducing processor load and conserving memory.

Figure 7:
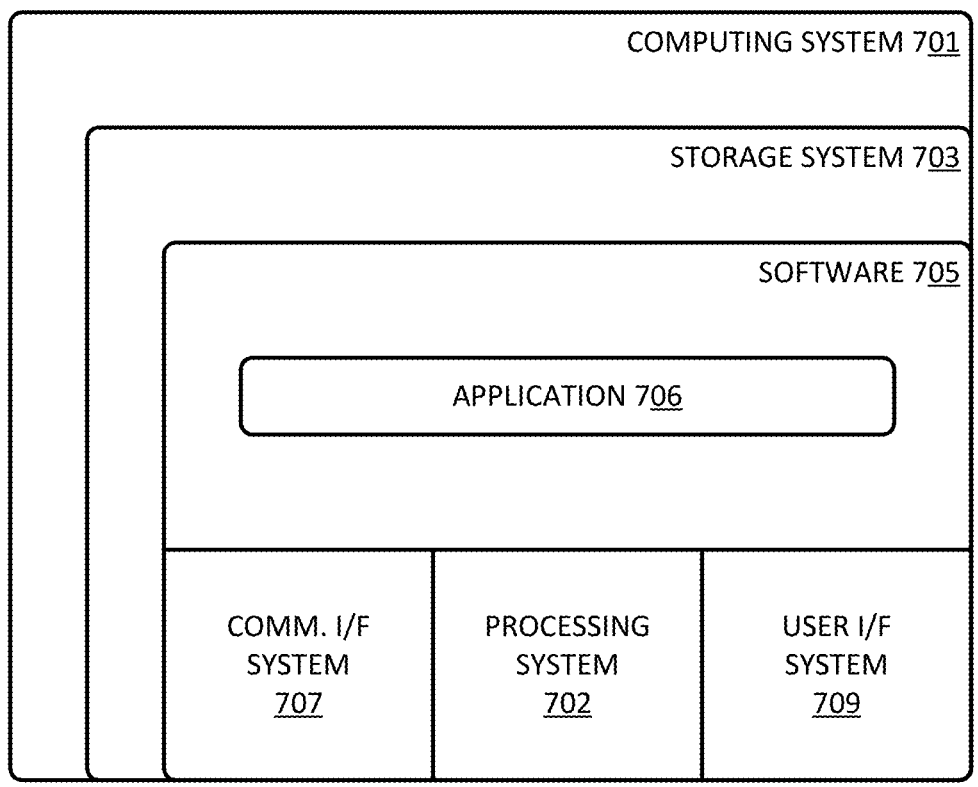
FIG. 7 illustrates a computing system suitable for implementing the cross-application service-driven technology disclosed herein, including any of the environments, architectures, elements, processes, user interfaces, and operational scenarios and sequences illustrated in the Figures and discussed below in the Technical Disclosure.

FIG. 7 illustrates computing system 701 that is representative of any system or collection of systems in which the various applications, services, scenarios, and processes disclosed herein may be implemented. Examples of computing system 701 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes application 706, which is representative of the applications discussed with respect to the preceding FIGS. 1-6, including spreadsheet applications and word processing applications described herein. When executed by processing system 702 to enhance cross-application service-driven systems, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for implementing cross-application service-driven systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include application 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to facilitate enhanced cross-application service-driven systems. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here.

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising: one or more computer readable storage media; and program instructions stored on the one or more computer readable storage media that, when executed by at least one processor, cause the at least one processor to at least: retrieve content from a server computing device, the content comprising at least one rule and at least one contextual message; store the content retrieved from the server computing device; detect, via a dynamic background application, an action associated with a client application; in response to detecting the action associated with the client application, identify a contextual message from the at least one contextual message based on a rule from the at least one rule; and display, via the dynamic background application, the identified contextual message within the client application. In further examples, to detect the action associated with the client application, the program instructions, when executed by the at least one processor, further cause the at least one processor to receive a signal from the client application when the action occurs. In further examples, to detect the action associated with the client application, the program instructions, when executed by the at least one processor, further cause the at least one processor to monitor the client application for an occurrence of the action. In further examples, the dynamic background application is independent of the client application. In further examples, the action includes at least one of launching the client application, opening a file associated with the client application, saving a file associated with the client application, sharing a file associated with the client application, and closing a file associated with the client application. In further examples, the at least one rule is based on at least one of the action associated with the client application, a type of client application, and user behavior associated with the client application. In further examples, the program instructions, when executed by at least one processor, further cause the at least one processor to retrieve updated content from the server computing device, the updated content comprising at least one updated rule and at least one updated contextual message. In further examples, the program instructions, when executed by at least one processor, further cause the at least one processor to display an updated contextual message from the at least one updated contextual message based on applying a rule from the at least one updated rule, the rule indicating the updated contextual message is relevant to a detected action associated with the client application. In further examples, the client application includes at least one of a word processing application, a spreadsheet application, and an electronic slide presentation application.

Further aspects disclosed herein provide an exemplary method for dynamically displaying contextual messages within a client application, the method comprising: retrieving content from a server computing device, the content comprising at least one rule and at least one contextual message; detecting, via a dynamic background application, an action associated with the client application; in response to detecting the action associated with the client application, identifying, via the dynamic background application, a contextual message from the at least one contextual message based on a rule from the at least one rule; and displaying, via the dynamic background application, the identified contextual message within the client application. In further aspects, the dynamic background application is independent of the client application. In further aspects, the action includes at least one of launching the client application, opening a file associated with the client application, saving a file associated with the client application, sharing a file associated with the client application, and closing a file associated with the client application. In further aspects, the at least one rule is based on at least one of the action associated with the client application, a type of client application, and user behavior associated with the client application. In further aspects, the method further comprises retrieving updated content from the server computing device, the updated content comprising at least one updated rule and at least one updated contextual message. In further aspects, the method further comprises displaying an updated contextual message from the at least one updated contextual message based on applying a rule from the at least one updated rule, the rule indicating the updated contextual message is relevant to a detected action associated with the client application.

Additional aspects disclosed herein provide exemplary systems comprising: at least one processor; and memory encoding computer executable instructions that, when executed by the at least one processor, perform a method for dynamically displaying contextual messages within a client application, the method comprising: retrieving a rule and a contextual message from a server computing device; detecting, via a dynamic background application, a first occurrence of an action associated with a first client application; in response to detecting the first occurrence of the action associated with the first client application, displaying, via the dynamic background application, the contextual message within the first client application; receiving an updated rule and an updated contextual message from the server computing device; detecting, via the dynamic background application, a second occurrence of the action associated with the first client application; and in response to detecting the second occurrence of the action associated with the first client application, displaying, via the dynamic background application, the updated contextual message within the first client application. In further examples, the method further comprises retrieving a plurality of rules and a plurality of contextual messages from the server computing device; detecting, via the dynamic background application, a first occurrence of an action associated with a second client application; in response to detecting the first occurrence of the action associated with the second client application, displaying, via the dynamic background application, a contextual message from the plurality of contextual messages within the second client application based on applying a rule from the plurality of rules relevant to the detected first occurrence of the action associated with the second client application. In further examples, the method further comprises retrieving a plurality of updated rules and a plurality of updated contextual messages from the server computing device; detecting, via the dynamic background application, a second occurrence of the action associated with the second client application; and in response to detecting the second occurrence of the action associated with the second client application, displaying, via the dynamic background application, an updated contextual message from the plurality of updated contextual messages within the second client application based on applying an updated rule from the plurality of updated rules relevant to the detected second occurrence of the action associated with the second client application. In further examples, the dynamic background application is independent of the first client application. In further examples, the dynamic background application is independent of the second client application.

Techniques for dynamically displaying contextual messages are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of cross-application service-driven systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
    one or more computer readable storage media;
    a processing system operatively coupled with the one or more computer readable storage media; and
    applications stored on the one or more computer readable storage media, wherein the applications comprise a background application and client applications, and wherein the background application comprises program instructions that, when executed by the processing system, directs the processing system to at least:
    retrieve content from a server computing device, the content comprising rules and contextual messages, where the rules and contextual messages are dynamically applied to the client applications;
    store the content retrieved from the server computing device;
    detect actions associated with the client applications;
    in response to detecting an action of the actions associated with a one of the client applications, identify a contextual message from the contextual messages that is relevant to the detected action and based on a rule from the rules; and
    display the identified contextual message within the one of the client applications.

2. The system of claim 1, wherein to detect the actions associated with the client applications, the program instructions, when executed by the at least one processor, further cause the processing system to receive a signal from the one of the client applications when the action occurs.

3. The system of claim 1, wherein to detect the actions associated with the client applications, the program instructions, when executed by the at least one processor, further cause the processing system to monitor the client applications for an occurrence of the actions.

4. The system of claim 1, wherein the background application is independent of the client applications.

5. The system of claim 1, wherein the action includes at least one of launching the one of the client applications, opening a file associated with the one of the client applications, saving a file associated with the one of the client applications, sharing a file associated with the one of the client applications, and closing a file associated with the one of the client applications.

6. The system of claim 1, wherein the rules are based on at least one of the action of the actions associated with the one of the client applications, a type of client application, and a user behavior associated with the client applications.

7. The system of claim 1, wherein the program instructions, when executed by the at least one processor, further cause the processing system to retrieve updated content from the server computing device, the updated content comprising at least one updated rule and at least one updated contextual message.

8. The system of claim 7, wherein the program instructions, when executed by the at least one processor, further cause the processing system to display an updated contextual message from the at least one updated contextual message based on applying a new rule from the at least one updated rule, the new rule indicating the updated contextual message is relevant to a detected action associated with the client applications.

9. The system of claim 1, wherein the client applications include at least one of a word processing application, a spreadsheet application, and an electronic slide presentation application.

10. A computer-implemented method for dynamically displaying contextual messages within a client application of a plurality of client applications, the method comprising:
    in a background application on a device, retrieving content from a server computing device, the content comprising rules and contextual messages, where the rules and contextual messages are dynamically applied to the plurality of client applications;
    in the background application, detecting actions associated with the plurality of client applications;
    in the background application, in response to detecting an action of the actions associated with the client application, identifying a contextual message from the contextual messages that is relevant to the detected action and based on a rule from the rules; and
    displaying the identified contextual message.

11. The computer-implemented method of claim 10, wherein the background application is independent of the client application.

12. The computer-implemented method of claim 10, wherein the action includes at least one of launching the client application, opening a file associated with the client application, saving a file associated with the client application, sharing a file associated with the client application, and closing a file associated with the client application.

13. The computer-implemented method of claim 10, wherein the rules are based on at least one of the action of the actions associated with the client application, a type of client application, a user behavior associated with the client application.

14. The computer-implemented method of claim 10, further comprising retrieving updated content from the server computing device, the updated content comprising at least one updated rule and at least one updated contextual message.

15. The computer-implemented method of claim 14, further comprising displaying an updated contextual message from the at least one updated contextual message based on applying a new rule from the at least one updated rule, the new rule indicating the updated contextual message is relevant to a detected action associated with the client application.

16. A system comprising:
    at least one processor; and
    applications, wherein the applications comprise a background application and client applications, and wherein the background application comprises program instructions that, when executed by the at least one processor, directs the at least one processor to perform a method for dynamically displaying contextual messages within a client application of the client applications, the method comprising:

retrieving rules and contextual messages from a server computing device, where the rules and contextual messages are dynamically applied to the client applications;

detecting a first occurrence of an action associated with a first client application;

in response to detecting the first occurrence of the action associated with the first client application, displaying one of the contextual messages that is relevant to the detected action and based on a rule from the rules within the first client application;

receiving an updated rule and an updated contextual message from the server computing device;

detecting a second occurrence of the action associated with the first client application; and in response to detecting the second occurrence of the action associated with the first client application, displaying the updated contextual message that is relevant to the detected action and based on the updated rule within the first client application.

17. The system of claim 16, the method further comprising:

detecting a first occurrence of an action associated with a second client application;

in response to detecting the first occurrence of the action associated with the second client application, displaying a different one of the contextual messages within the second client application based on applying a rule from the rules relevant to the detected first occurrence of the action associated with the second client application.

18. The system of claim 17, the method further comprising:

retrieving a plurality of updated rules and a plurality of updated contextual messages from the server computing device;

detecting a second occurrence of the action associated with the second client application; and in response to detecting the second occurrence of the action associated with the second client application, displaying an updated contextual message from the plurality of updated contextual messages within the second client application based on applying an updated rule from the plurality of updated rules relevant to the detected second occurrence of the action associated with the second client application.

19. The system of claim 17, wherein the background application is independent of the second client application.

20. The system of claim 16, wherein the background application is independent of the first client application.

* * * * *